(12) United States Patent
Springer et al.

(10) Patent No.: US 6,416,311 B1
(45) Date of Patent: Jul. 9, 2002

(54) DEVICE AND METHOD FOR SEPARATING A SHAPED SUBSTRATE FROM A STAMPING TOOL

(75) Inventors: Alf Springer, Milda; Frank Reuther, Rudolstadt; Lutz Mueller, Jena, all of (DE)

(73) Assignee: JENOPTIK Aktiengesellschaft, Jena (DE)

(*) Notice: Subject to any disclaimer, the term of this patent is extended or adjusted under 35 U.S.C. 154(b) by 0 days.

(21) Appl. No.: 09/462,194
(22) PCT Filed: Apr. 21, 1999
(86) PCT No.: PCT/EP99/02676
§ 371 (c)(1),
(2), (4) Date: Jan. 3, 2000
(87) PCT Pub. No.: WO99/56928
PCT Pub. Date: Nov. 11, 1999

(30) Foreign Application Priority Data

May 4, 1998 (DE) .......................... 198 19 761

(51) Int. Cl.⁷ .................. B23P 19/00; A01J 21/00; A21C 11/02
(52) U.S. Cl. .................. 425/385; 425/437; 29/426.1
(58) Field of Search .................. 29/426.1, 426.5, 29/426.6; 101/327, 41; 425/436 R, 437, 405.1, 405.2, 388, 389, 411, 385

(56) References Cited

U.S. PATENT DOCUMENTS 5,213,600 A * 5/1993 Greschner et al. ............ 65/102
5,599,565 A * 2/1997 Dittlo

FOREIGN PATENT DOCUMENTS

| DE | 19648844 | | 9/1997 |
| EP | 06640168 B1 | | 7/1995 |
| JP | 403006366 | * | 1/1991 |
| JP | 6293965 | | 10/1994 |
| JP | 08025434 A | * | 1/1996 |

OTHER PUBLICATIONS

English Abstract of EP 0664168 B1
English Abstract of DE 19648844.
English Abstract of JP 6293965.

* cited by examiner

Primary Examiner—S. Thomas Hughes
Assistant Examiner—John C. Hong
(74) Attorney, Agent, or Firm—Reed Smith LLP

(57) ABSTRACT

The object, in a device and a method for separating a shaped substrate from a stamping tool, is to make demolding more functionally reliable and to substantially prevent damage to expensive components. A closeable chamber, the mutually moveable chamber parts of which are the support for the stamping tool and for the shapeable substrate, contains a substrate holder which, when the chamber is closed, fixes the substrate to its support outside the stamping area, with the result that the substrate is detached from the stamping tool when the chamber is opened. The device and method can be used for the production of microengineered components.

7 Claims, 3 Drawing Sheets

DEVICE AND METHOD FOR SEPARATING A SHAPED SUBSTRATE FROM A STAMPING TOOL

FIELD OF THE INVENTION

The invention relates to the separation of a shaped substrate from a stamping tool having a pair of chamber parts, which can move with respect to one another, of a closeable chamber, of which a first chamber part serves as a support for the stamping tool and a second chamber part serves as a support for the shapeable substrate.

DESCRIPTION OF THE RELATED ART

A method for producing microengineered components is known under the name of LIGA process (LIGA is a German acronym for Lithography with Synchrotron Radiation, Electroplating, Molding using plastics). By pressing a molding tool into a moldable material, such as for example a layer of thermoplastic, three-dimensional patterns with heights in the range from a few nanometers to a few hundred micrometers are produced, preferably under vacuum and at a temperature which lies above the softening temperature of the moldable material.

A device in accordance with DE 196 48 844 C1 which is suitable for this purpose contains a chamber with one chamber part fixed to the frame and one moveable chamber part. Setting the pressure and temperature conditions inside the chamber is linked to predetermined values of a force acting on the fixed chamber part.

After the hot-molding process has finished, the moldable material which has been applied to a substrate support on the fixed chamber part adheres to the patterns of the molding tool due to large aspect ratios, shrinkage processes and surface roughness of the molding tool caused by the process, and has to be separated in a suitable manner.

A device in accordance with DE 195 09 452 A1, which is intended to keep flexural stresses at a low level during demolding and to avoid geometric limitations on the molding-tool surface available is used for this demolding.

A mold insert whose microstructure is transferred to a molded part is surrounded, in its edge area, by an ejector which, in order to demold the molded part, can be moved between an at-rest position and a working position. A space which can be filled with a pressurized fluid is provided on that side of the ejector which is remote from the molded part. In the working position of the ejector, the intention is that the fluid should act beneath the edges of the molded part, build up a pressure between the mold insert and the molded part which is to be demolded and, as a result, assist with demolding. Moreover, it is intended that the ejector be moved into its working position with the aid of the pressure from the fluid.

However, in the solution disclosed a method of operation of this nature, in which the space provided for the dual function of the fluid has to be designed as a pressure chamber and, in order to displace the ejector, has to act as a pneumatic cylinder, involves considerable unreliability. This is because the mold insert and the adjoining ejector, together with the layer of the molded part lying above it, are provided as wall elements of the space. The undefined adhesion of the molded part on the ejector may lead to unsealed areas and may have a considerable adverse effect on the function of the device.

Also, the control of the demolding process is undefined, both as a result of the force control applied and the termination by means of mechanical stops. The behavior of the shaped part remains largely uncontrollable.

A further drawback is the edge-side matching of the ejector to the mold insert, since such a direct interface with an expensive component unnecessarily increases the risk of damage or of some other adverse effect on the tool.

OBJECT AND SUMMARY OF THE INVENTION

The primary object of the invention is to make demolding more operationally reliable and to largely prevent damage to expensive components.

According to the invention, the object is achieved by means of a device for separating a shaped substrate from a stamping tool having a pair of chamber parts, which can be moved with respect to one another, of a closeable chamber, of which a first chamber part serves as a support for the stamping tool and a second chamber part serves as a support for the shapeable substrate. The chamber contains a substrate holder which, when the chamber is closed, fixes the substrate to its support outside the stamping area, with the result that the substrate is detached from the stamping tool when the chamber is opened.

Furthermore, the substrate holder can be displaced parallel to the direction of movement of the chamber parts and, together with the support for the stamping tool, encloses a first pressure chamber. Advantageously, the first pressure chamber is machined into the support for the stamping tool as an annular groove which the substrate holder delimits.

The pressure chamber contains the substrate holder as a moveable part and operates, with a high level of reliability, as a pneumatic cylinder with which the substrate holder is moved towards the substrate by increasing the volume of the chamber.

It is also advantageous if the substrate holder surrounds a tool holder on the support for the stamping tool, which tool holder engages around the peripheral face of the stamping tool. This avoids a direct interface between the expensive stamping tool and a moveable part, thus considerably reducing the risk of damage.

Furthermore, the substrate holder, where it rests on the substrate, delimits, together with the tool holder, a second pressure chamber, into which at least one duct for compressed air is guided, through the tool holder, in order to assist with detaching the substrate from the stamping tool when the chamber is opened.

The support for the stamping tool contains feed ducts for compressed air, a first of which ducts is connected to the first pressure chamber and a second of which ducts is connected to the duct in the tool holder.

Moreover, the invention also relates to a method for separating a shaped substrate from a stamping tool inside a closed chamber which contains a pair of chamber parts which can move with respect to one another, of which a first chamber part serves as a support for the stamping tool and a second chamber part serves as a support for the shapeable substrate. The substrate is fixed to its support in an edge area which lies outside a stamping area and is detached from the stamping tool by opening the chamber.

It is advantageous if an initial detachment area which is formed in the fixed edge area when the chamber is opened is increased in size by means of compressed air and further opening of the chamber until the substrate is completely separated from the stamping tool.

In contrast to the known solution in accordance with DE 195 09 452 A1, in which the molded part is detached from the mold insert in functional terms only by means of force control by way of the ejector, the detachment of the substrate from the stamping tool is divided into various functional sequences which can be controlled differently. While the substrate is held to its support in the edge area, it is possible to separate it from the stamping tool by suitably regulating the opening of the chamber. The performance of the molded part remains largely controllable. The substrate is not stripped off or ejected, but rather is initially held in place and is then pulled off.

For the functional sequences which can be carried out by means of compressed air, separate pressure chambers are provided, in which stable pressure conditions prevail at any time. Advantageously, the detachment operation can at any time be reliably controlled in such a way that the moldable material is removed evenly, without spring-back effects and without tearing off patterns from the tool. The avoidance of manual rework, together with the possibility of automating the separate process steps which can be reproduced subsequent to molding, lead to an increase in productivity.

The invention is to be explained in more detail below with reference to the diagrammatic drawings.

DESCRIPTION OF THE PREFERRED EMBODIMENTS

Figure 1:
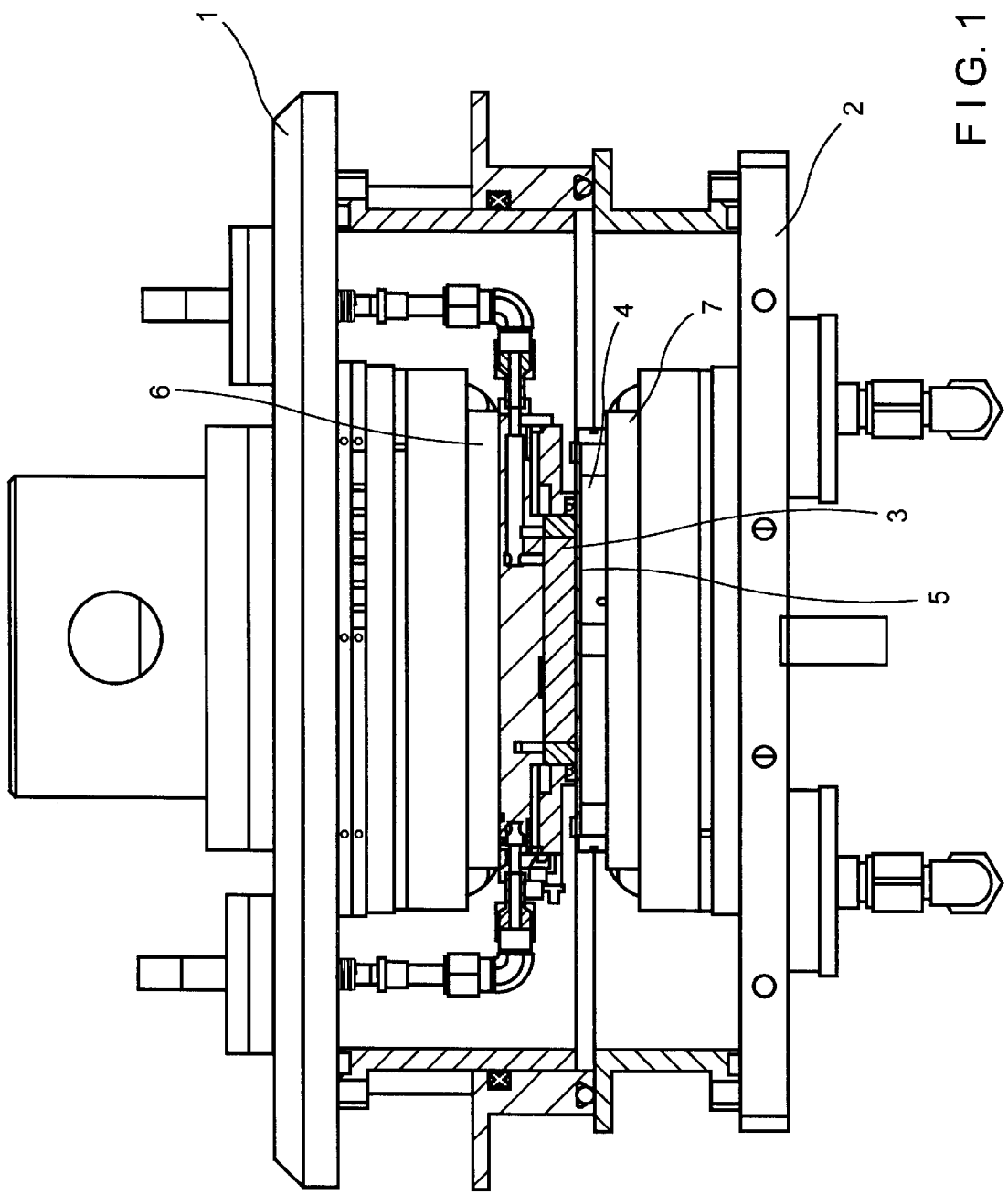
FIG. 1 shows a device for molding microengineered patterns.

The molding device in accordance with FIG. 1, which operates under a vacuum, is constructed as a closeable chamber and comprises chamber parts 1, 2 which can move with respect to one another, of which one chamber part 1 contains a support for a stamping tool 3 and the other chamber part 2, on a substrate support 4, contains a shapeable substrate 5. Temperature-control plates 6, 7 set a temperature required for hot-stamping.

Figure 2:
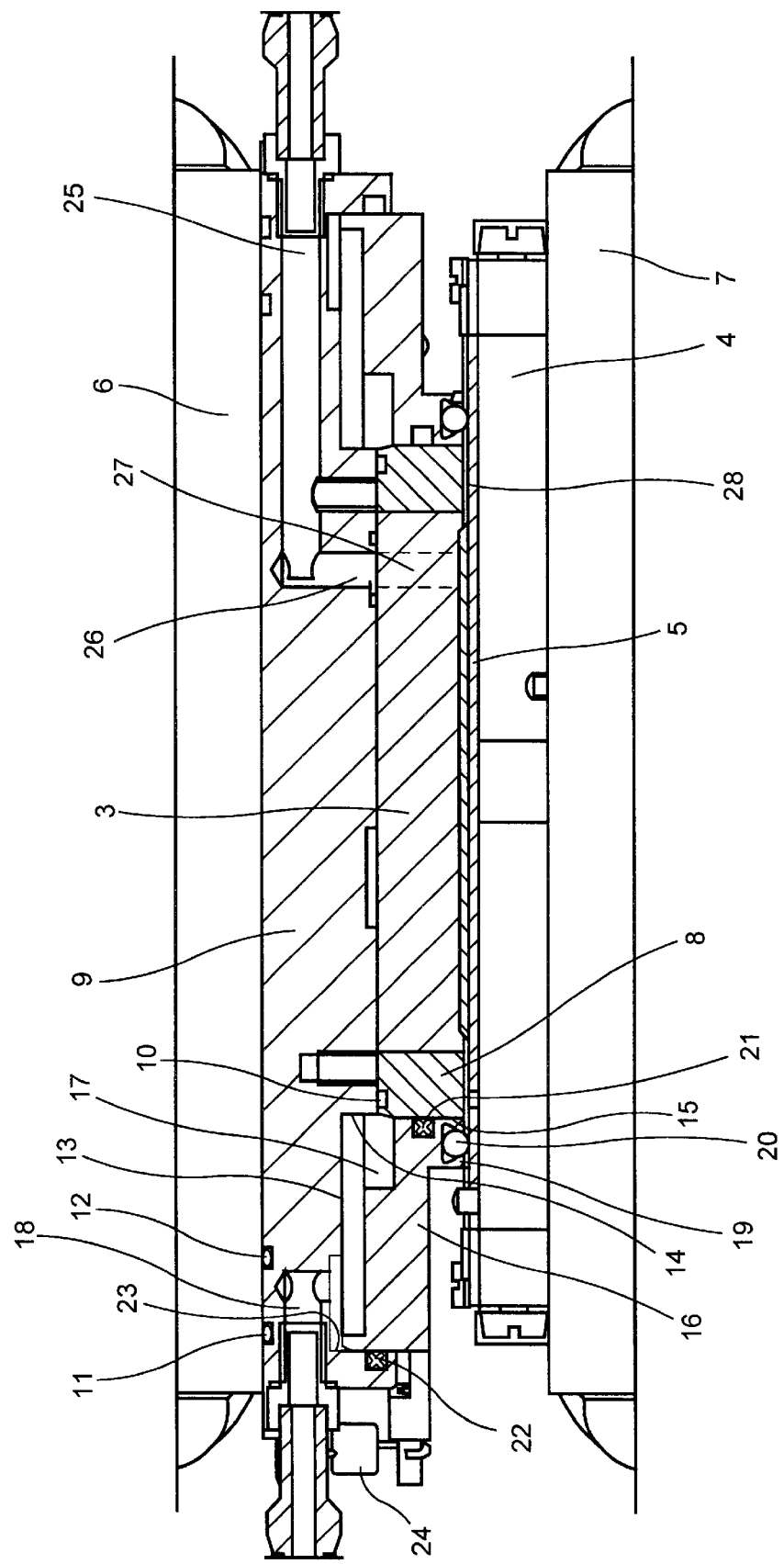
FIG. 2 shows a demolding device contained in the device in accordance with FIG. 1.
Figure 3:
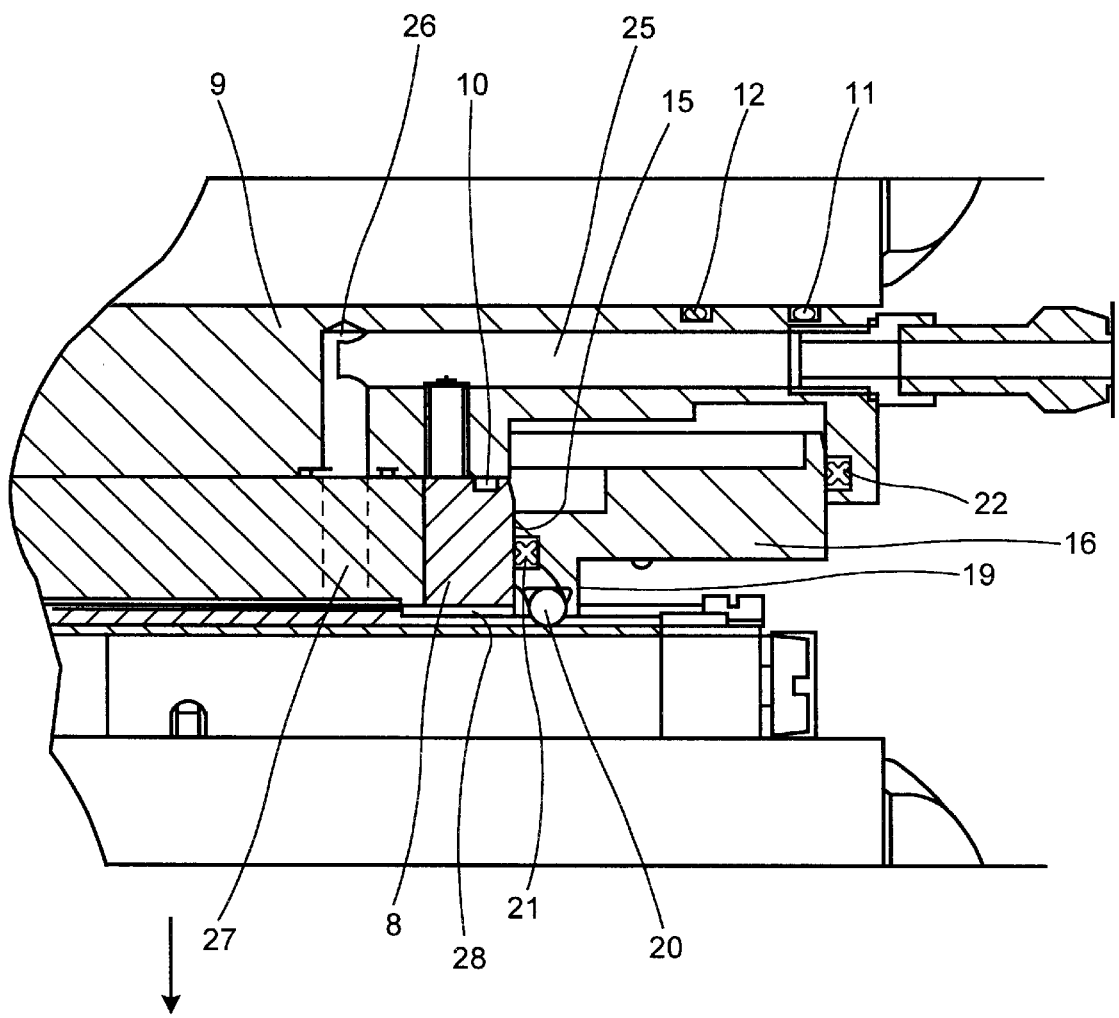
FIG. 3 shows an excerpt from the demolding device after demolding has taken place.

As can be seen more clearly from FIG. 2, the support for the stamping tool 3 contains a cylindrical tool holder 8, which is attached to a base plate 9 and sealed by a sealing ring 10 and engages around the peripheral face of the stamping tool 3. An annular groove 13, the inner cylindrical face 14 of which is extended by the cylindrical circumferential face 15 of the tool holder 8, is machined in the base plate 9, which is attached to the temperature-control plate 6 and sealed via sealing rings 11, 12. An annular substrate holder 16, which can be displaced parallel to the direction of movement of the chamber parts, forms, together with the groove 13 and the circumferential face 15 which extends it, a first pressure chamber 17, into which a first feed duct 18 for compressed air is guided through the base plate 9. The substrate holder 16, which on the end side has a projection 19, which serves as a blank holder, with a surrounding seal 20, bears, by way of sealing means 21, 22, against the outer cylindrical face 15 of the tool holder 8 and against the outer cylindrical face 23 of the groove 13, respectively. This ensures that the substrate holder 16, which can move in the axial direction, is able to operate like the piston of a pneumatic cylinder. The range of movement is delimited in one direction by the base plate 9 and in the other direction by stops, which are not shown. Restoring springs 24 serve to return the substrate holder 16 to its at-rest position after the feed of compressed air has been stopped. In the at-rest position, the substrate holder 16 is raised sufficiently far for the projection 19, together with the surrounding seal 20, not to project beyond the structured surface of the stamping tool 3, although this is not shown in any of the figures.

A second feed duct 25 for compressed air in the base plate 9 opens into a vertically running duct 26 and is extended, by a further duct 27 in the tool holder 8, as far as an end-side outlet. The two feed ducts 18, 25 are supplied by a molding-device pneumatic control system (not shown) and can be activated separately.

The stamping cycle, in which the pattern of the surface of the stamping tool 3 is transferred to the substrate, for example in accordance with DE 196 48 844 C1, begins with the closure of the molding device. At this time, the substrate holder 16 is in the at-rest position. After the appropriate atmospheric conditions (vacuum) have been set using the pneumatic control system and the desired temperature has been set using the temperature-control plates 6, 7, the two chamber parts 1, 2 are positioned vertically with respect to one another in a force- and distance-controlled manner until the stamping tool 3 comes into contact with the shapeable substrate 5. Then, by means of a force-controlled positioning operation, the substrate 5 is pressed into the stamping tool 3 in accordance with set process parameters. After that, the chamber is cooled to a process-dependent demolding temperature by means of the temperature-control plates 6, 7. During this period, the surface contact between the stamping tool 3 and the substrate 5 which has been brought about by the stamping operation is maintained in a force-regulated manner.

When the demolding temperature has been reached, standard atmospheric pressure conditions are again established in the chamber. After the pressure equalization has taken place, compressed air is applied to the feed duct 18 by means of the pneumatic unit, compressed air being understood to mean a pressurized, gaseous medium which is suitable for the process.

As a result of the pressure building up in the first pressure chamber 17, the substrate holder 16 is displaced towards the chamber part 2 until the projection 19, together with the surrounding seal 20, rests on the surface of the substrate 5. Since this contact stops the movement, the substrate 5 is pressed towards the substrate support 4 with a force which is proportional to the air pressure. The sealed bearing of the annular projection 19 on the substrate 5 produces a second pressure chamber 28 which is also delimited by the substrate 5, the tool holder 8 and the stamping tool 3 and into which the duct 27 opens out.

After the pressure chamber 28 has been filled with compressed air via the ducts 25, 26, 27, the distance between the two chamber parts 1, 2 is continuously increased. The substrate 5, which is constantly pressed on to the substrate support 4 by the substrate holder 16 due to the pressure prevailing in the first pressure chamber 17, is pulled off the stamping tool 3 from the edge. The compressed air present in the second pressure chamber 28 immediately flows into the gap which is formed and assists with detachment of the substrate 5, with a demolding force which is proportional to the air pressure. The increase in the area on which the air acts, which increase is related to the progressive detachment, leads to a further increase in the demolding force. The detachment process is uniformly distributed over the periphery of the substrate 5 and is not associated with any spring-back effects.

The continuous movement of the chamber parts 1, 2 is carried out with a defined, uniform speed for a predetermined distance. After the end of this movement, the compressed-air feed to the pressure chambers 17 and 28 is interrupted. The restoring springs 24 move the substrate holder 16 back into its at-rest position.

When the substrate 5 has been completely detached from the stamping tool 3, the chamber can be opened.

While the foregoing description and drawings represent the present invention, it will be obvious to those skilled in the art that various changes may be made therein without departing from the true spirit and scope of the present invention.

What is claimed is:

1. In a stamping tool, a device for separating a shaped substrate from the stamping tool having a pair of chamber parts of a closeable chamber, which can move with respect to one another, of which a first chamber part serves as a support for the stamping tool and a second chamber part serves as a support for the shaped substrate, comprising:

a substrate holder contained within the first chamber part, which can be displaceable parallel to the direction of movement of the chamber parts and, together with the support for the stamping tool, encloses a first pressure chamber and, when the chamber is closed, fixes the substrate to its support outside a stamping area with the result that the substrate is detached from the stamping tool when the chamber is opened.

2. The device according to claim 1, wherein the substrate holder surrounds a tool holder on the support for the stamping tool, which tool holder engages around a peripheral face of the stamping tool.

3. The device according to claim 2, wherein the first pressure chamber is machined into the support for the stamping tool as an annular groove which the substrate holder delimits.

4. The device according to claim 3, wherein the substrate holder, where it rests on the substrate, delimits, together with the tool holder, a second pressure chamber, into which at least one duct for compressed air guided, through the tool holder, in order to assist with detaching the substrate from the stamping tool when the closeable chamber is opened.

5. The device according to claim 4, wherein the support for the stamping tool contains feed ducts for compressed air, a first of which ducts is connected to the first pressure chamber and a second of which ducts is connected to the duct in the tool holder.

6. In a stamping tool, a device for separating a shaped substrate from the stamping tool having a pair of chamber parts of a closeable chamber, which can move with respect to one another, of which a first chamber part serves as a support for the stamping tool and a second chamber part serves as a support for the shaped substrate, comprising:

a substrate holder contained within the first chamber part, which surrounds a tool holder on the support for the stamping tool, which tool holder engages around a peripheral face of the stamping tool, the substrate holder can be displaceable parallel to the direction of movement of the chamber parts and, together with the support for the stamping tool, encloses a first pressure chamber and, when the chamber is closed, fixes the substrate to its support outside a stamping area with the result that the substrate is detached from the stamping tool when the chamber is opened.

7. In a stamping tool, a device for separating a shaped substrate from the stamping tool having a pair of chamber parts of a closeable chamber, which can move with respect to one another, of which a first chamber part serves as a support for the stamping tool and a second chamber part serves as a support for the shaped substrate, comprising:

a substrate holder contained within the first chamber part, which can be displaceable parallel to the direction of movement of the chamber parts and, together with the support for the stamping tool, encloses a first pressure chamber and, when the chamber is closed and the distance between the first and the second chamber part is increased, fixes the substrate to its support outside a stamping area due to a pressure prevailing in the first pressure chamber, with the result that the substrate is detached from the stamping tool when the distance between the first and the second chamber part is increased and the chamber is opened.

* * * * *